United States Patent
Sugiura et al.

(10) Patent No.: US 6,185,176 B1
(45) Date of Patent: Feb. 6, 2001

(54) OPTICAL PICKUP APPARATUS

(75) Inventors: Satoshi Sugiura; Akihiro Tachibana; Yoshihisa Kubota, all of Tsurugashima (JP)

(73) Assignee: Pioneer Electronic Corporation, Tokyo (JP)

(*) Notice: Under 35 U.S.C. 154(b), the term of this patent shall be extended for 0 days.

(21) Appl. No.: 09/081,801

(22) Filed: May 20, 1998

(30) Foreign Application Priority Data

May 22, 1997 (JP) .................................................... 9-132184

(51) Int. Cl.[7] ......................................................... G11B 7/12
(52) U.S. Cl. ........................ 369/112; 369/103; 369/44.12
(58) Field of Search ..................................... 369/112, 103, 369/109, 100, 44.11, 44.12, 44.14; 359/562, 569, 573

(56) References Cited

U.S. PATENT DOCUMENTS 5,717,674 * 2/1998 Mori et al. ............................ 369/103

OTHER PUBLICATIONS

Japanese Patent No.: 2532818, (KoKai No. Hei 7–98431) and English translation of the Abstract.

* cited by examiner

Primary Examiner—Muhammad Edun
(74) Attorney, Agent, or Firm—Perman & Green, LLP

(57) ABSTRACT

An optical pickup apparatus which can be designed compact while having a plurality of semiconductor lasers. The optical pickup apparatus, which reads recorded information from an optical recording medium, comprises an optical system including light intensity detection element having a quarter-split light receiving surface, two semiconductor lasers for emitting light beams of different wavelengths, an objective lens for directing each of the light beams onto an optical recording medium to form a light spot on a recording surface, and a holographic optical element located between the quarter-split light receiving surface and the objective lens, whereby the holographic optical element eliminates coma aberration and spherical aberration of light beams launched from the two semiconductor lasers and traveled through the recording surface and the objective lens, thereby generating a predetermined amount of astigmatism. The holographic optical element further has a lens performance for converging light beams, launched from the two semiconductor lasers and traveled through the recording surface and the objective lens, onto the quarter-split light receiving surface.

18 Claims, 11 Drawing Sheets

OPTICAL PICKUP APPARATUS

BACKGROUND OF THE INVENTION

1. Field of the Invention

The present invention relates to an optical pickup in an optical recording and reproducing apparatus.

2. Description of the Related Art

Optical recording and reproducing apparatuses include an optical disk player which reads recorded information from an optical recording medium or an optical disk, such as a so-called LD (Laser Disc), CD (Compact Disc) or DVD (Digital Video Disc). There also is a compatible disk player which reads information from those different kinds of optical disks.

An optical pickup of that compatible disk player like an ordinary one has an optical system which irradiates a light beam to an optical disk and reads return light from the optical disk.

Those optical disks as optical information recording media are designed with different specifications including the numerical aperture NA, the thickness of the substrate and the optimal wavelength of read light. Implementation of an optical pickup for a compatible player for LD, CD and DVD therefore requires that at least two differences in the numerical aperture NA and substrate thickness should be compensated.

For example, a two-focus pickup using a holographic lens (disclosed in Japanese Patent No. 2532818 and Japanese Patent Application Kokai No. Hei 7-98431) has a composite objective lens, which includes a convex objective lens and a holographic lens, and a diffraction grating with concentric ring-shaped recesses and projections, i.e., diffraction grooves, provided on a transparent plate of the holographic lens, and the performance of a concave lens is imparted on this transparent plate to form a focal point on the recording surface in accordance with each optical disk. At this time, the light beam directly passes through the area where the diffraction grooves are not formed, and converges, together with the zero-order diffraction light, onto the objective lens, resulting in differences in numerical aperture between the transmitted light and the zero-order diffraction light and the first-order diffraction light. The first-order diffraction light that has been diffracted by the diffraction grooves is used to read information from a CD which has a small numerical aperture, and the transmitted light and the zero-order diffraction light which have larger numerical apertures are used to read information from a DVD.

This conventional compatible player is designed to form read spots by means of a single, common light source. Generally, a light source which launches read light having a wavelength of 650 nm suitable for reproduction of a DVD is also used to play back a CD. To play back a CD-R (CD Recordable or R-CD (Recordable CD)), which can be written once by a light source with a wavelength of 780 nm, by using this read light, therefore, satisfactory reproduction signals cannot be acquired due to the insufficient sensitivity that results from a difference in wavelength.

To realize a compatible player capable of adequately recording and reproducing information on, and from, a CD-R as well as an LD, CD and DVD, it is essential to cope with at least three differences in numerical aperture NA, substrate thickness and the wavelength of the light source in use (780-nm type and 650-nm type). To implement a compatible player for an LD, CD, DVD and CD-R, therefore, it is necessary to design an optical pickup or head using a light source of multiple wavelengths suitable for the respective disks, not a light source of a single wavelength.

Constructing an optical system like a prism or lens using a plurality of light sources, however, complicates and enlarges the whole optical pickup or head.

OBJECT AND SUMMARY OF THE INVENTION

Accordingly, it is an object of the present invention to provide an optical pickup apparatus which can be designed compact and has a holographic optical element suitable for an astigmatism scheme that employs light intensity detection means having a quarter-split light receiving surface.

According to this invention, an optical pickup apparatus for reading recorded information from an optical recording medium includes an optical system which comprises: light intensity detection means having a quarter-split light receiving surface; two semiconductor lasers for emitting light beams of different wavelengths; an objective lens for directing each of the light beams onto an optical recording medium to form a light spot on a recording surface; and a holographic optical element located between the quarter-split light receiving surface and the objective lens, wherein the holographic optical element eliminates coma aberration and spherical aberration of a light beam traveled through the recording surface and the objective lens, thereby generating a predetermined amount of astigmatism.

In the optical pickup apparatus, the holographic optical element may further have a lens performance for converging a light beam, traveled through the recording surface and the objective lens, onto the quarter-split light receiving surface.

According to another aspect of the invention, the optical pickup apparatus is characterized in that the holographic optical element passes a light beam of a first wavelength launched from one of the semiconductor lasers, guides zero-order diffraction light of the light beam to the objective lens, diffracts the zero-order diffraction light of the first wavelength traveled through the recording surface, and guides positive first-order diffraction light, acquired by diffraction, to the quarter-split light receiving surface.

According to a further aspect of the invention, the optical pickup apparatus is characterized in that the other one of the semiconductor lasers is located at such a position that the holographic optical element passes a light beam of a second wavelength launched from the other semiconductor laser, guides zero-order diffraction light of the light beam to the objective lens, diffracts the zero-order diffraction light of the second wavelength traveled through the recording surface, and guides positive first-order diffraction light, acquired by diffraction, to the quarter-split light receiving surface.

According to a still further aspect of the invention, the optical pickup apparatus is characterized in that the other one of the semiconductor lasers is located at such a position that the holographic optical element passes a light beam of a second wavelength launched from the other semiconductor laser, guides negative first-order diffraction light of the light beam to the objective lens, receives return light from a light spot on the recording surface, produced by the negative first-order diffraction light of the second wavelength, from the objective lens, diffracts the return light, and guides positive firstorder diffraction light of the second wavelength, acquired by diffraction, to the quarter-split light receiving surface; and that the optical system further includes an aberration correcting element, located between the holographic optical element and the objective lens, for passing the light beam of the second wavelength launched from the other semiconductor laser without acting on the light beam of the first wavelength, and guiding the light beam of the second wavelength to the objective lens while eliminating aberration from the light beam of the second wavelength.

According to a further aspect of the invention, the optical pickup apparatus is characterized in that the other one of the semiconductor lasers is located at such a position that the holographic optical element passes a light beam of a second wavelength launched from the other semiconductor laser, guides negative first-order diffraction light of the light beam to the objective lens, receives return light from a light spot on the recording surface, produced by the negative first-order diffraction light of the second wavelength, from the objective lens, diffracts the return light, and guides positive first-order diffraction light of the second wavelength, acquired by diffraction, to the quarter-split light receiving surface; and that the optical system further includes a light-source side aberration correcting element, located between the other semiconductor laser and the holographic optical element, for passing the light beam of the second wavelength launched from the other semiconductor laser, giving the light beam of the second wavelength such aberration as to cancel aberration, which occurs at a time the light beam of the second wavelength passes the holographic optical element, and guiding the light beam of the second wavelength to the holographic optical element, thereby eliminating aberration from the light beam of the second wavelength having passed the holographic optical element.

According to a further aspect of the invention, the optical pickup apparatus may be characterized in that the optical system further includes a second quarter-split light receiving surface; and that the other one of the semiconductor lasers is located at such a position that the holographic optical element passes a light beam of a second wavelength launched from the other semiconductor laser, guides zero-order diffraction light of the light beam to the objective lens, diffracts the zero-order diffraction light of the second wavelength traveled through the recording surface, and guides positive first-order diffraction light, acquired by diffraction, to the second quarter-split light receiving surface.

According to a further aspect of the invention, the optical pickup apparatus may be characterized in that the optical system further includes a second quarter-split light receiving surface;

that the other one of the semiconductor lasers is located at such a position that the holographic optical element passes a light beam of a second wavelength launched from the other semiconductor laser, guides negative first-order diffraction light of the light beam to the objective lens, receives return light from a light spot on the recording surface, produced by the negative first-order diffraction light of the second wavelength, from the objective lens, diffracts the return light, and guides positive first-order diffraction light of the second wavelength, acquired by diffraction, to the quarter-split light receiving surface; and that the optical system further includes an aberration correcting element, located between the holographic optical element and the objective lens, for passing the light beam of the second wavelength launched from the other semiconductor laser without acting on the light beam of the first wavelength, and guiding the light beam of the second wavelength to the objective lens while eliminating aberration from the light beam of the second wavelength.

According to a further aspect to the invention, the optical pickup apparatus is characterized in that the optical system further includes a second quarter-split light receiving surface;

that the other one of the semiconductor lasers is located at such a position that the holographic optical element passes a light beam of a second wavelength launched from the other semiconductor laser, guides negative first-order diffraction light of the light beam to the objective lens, receives return light from a light spot on the recording surface, produced by the negative first-order diffraction light of the second wavelength, from the objective lens, diffracts the return light, and guides positive first-order diffraction light of the second wavelength, acquired by diffraction, to the second quarter-split light receiving surface; and that the optical system further includes a light-source side aberration correcting element, located between the other semiconductor laser and the holographic optical element, for passing the light beam of the second wavelength, giving the light beam of the second wavelength launched from the other semiconductor laser such aberration as to cancel aberration, which occurs at a time the light beam of the second wavelength passes the holographic optical element, and guiding the light beam of the second wavelength to the holographic optical element, thereby eliminating aberration from the light beam of the second wavelength having passed the holographic optical element.

According to a further aspect of the invention, the optical pickup apparatus having the aberration correcting element is characterized in that the aberration correcting element may be a liquid crystal type aberration correcting element having transparent electrodes formed on inner surfaces of a pair of transparent glass substrates in a pattern corresponding to an aberration correcting wave surface, and a liquid crystal layer provided between the transparent electrodes, and can be enabled or disabled selectively by applying a voltage to the transparent electrodes in association with switching between the semiconductor lasers.

According to a further aspect of the invention, the optical pickup apparatus having the aberration correcting element is characterized in that the aberration correcting element is an aberration correcting element of a non-linear optical material type having a transparent substrate of a wavelength-selectable non-linear optical material and an isotropic optical material, filled in recesses formed on the transparent substrate and having a pattern corresponding to an aberration correcting wave surface, and having a refractive index equal to a refractive index of extraordinary ray or a refractive index of ordinary ray of the non-linear optical material, and can be enabled or disabled selectively by applying a voltage to the transparent electrodes in association with switching between the semiconductor lasers.

As this invention can permit light paths to be shared by a holographic optical element common to a plurality of semiconductor lasers, the optical system of the optical pickup can be simplified.

DETAILED DESCRIPTION OF THE PREFERRED EMBODIMENTS

Preferred embodiments of this invention will now be described with reference to the accompanying drawings.

First Embodiment

Figure 1:
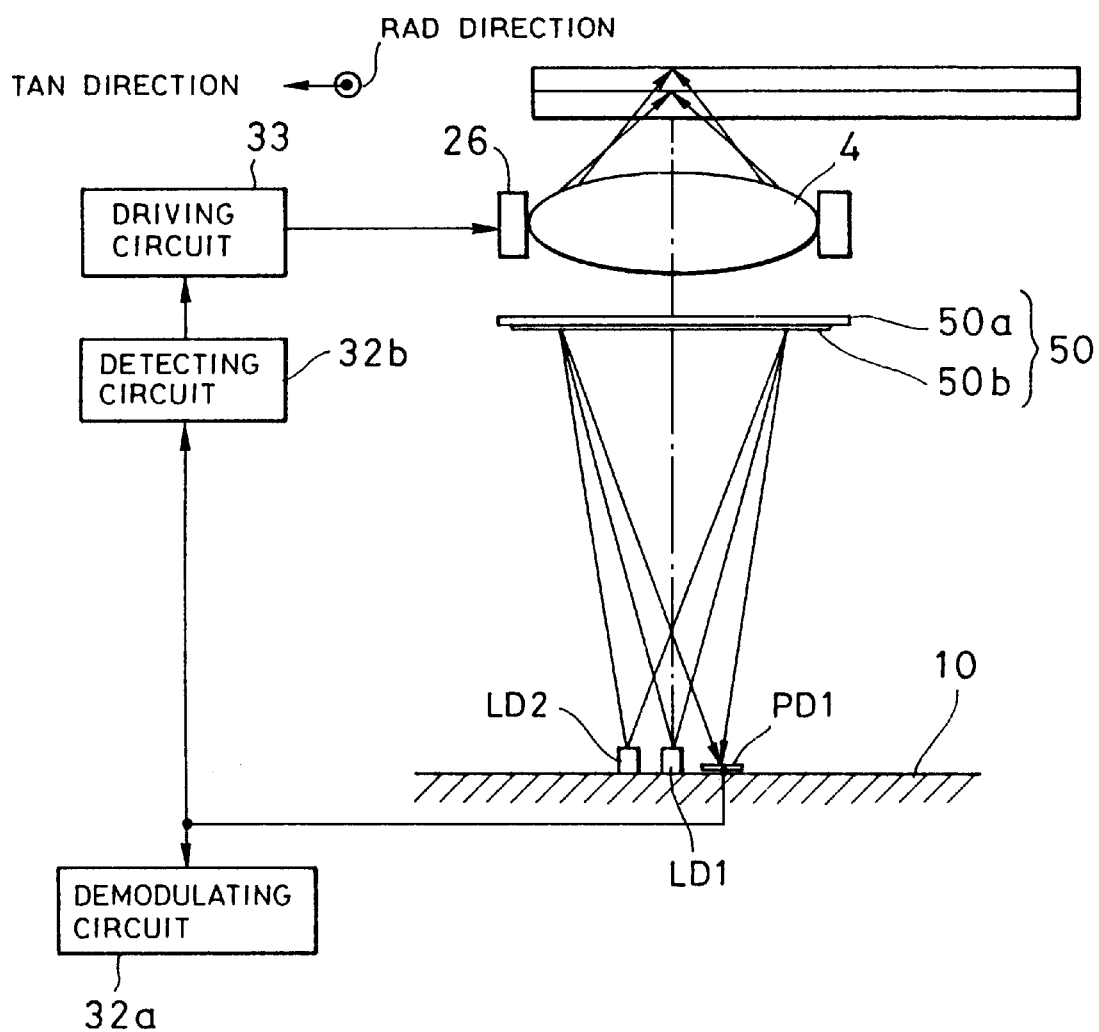
FIG. 1 is a schematic structural diagram showing the interior of an optical pickup apparatus according to a first embodiment of this invention.

FIG. 1 schematically shows an optical pickup of a recording and reproducing apparatus according to a first embodiment. The pickup body accommodates a semiconductor laser LD1 (wavelength of, for example, 650 nm; $\lambda 1$) for reading information from a DVD and a semiconductor laser LD2 (wavelength of, for example, 780 nm; $\lambda 2$) for reading information from a CD, both mounted on a common heat sink (not shown) in such a way as to launch light beams upward. Further provided in the pickup body are a holographic optical element 50, an objective lens 4 whose optical axis is common to that of the holographic optical element 50 and which converges a light beam onto an optical disk 5 to form a light spot, and a quarter-split light receiving surface PD1 of a photodetector which receives reflected light from the light spot. The objective lens 4, the holographic optical element 50 and a substrate 10 are arranged approximately in parallel to one another.

The heat sink for the semiconductor lasers LD1 and LD2 is secured onto the substrate 10 on which the quarter-split light receiving surface PD1 of the photodetector for detecting the intensity of light is formed under the holographic optical element 50.

The objective lens 4 can be constructed to absorb differences in the disk's thickness and numerical aperture in accordance with the specifications of a CD and DVD by, for example, selecting a combination of a condenser lens and a Fresnel lens or a holographic lens, switching two objective lens, which match for the respective specifications, from one to the other as needed, or providing a condenser lens for a DVD with some means for restricting the aperture at the time of playing back a CD. Alternatively, the condenser lens itself may be a two-focus objective lens designed for both a CD and DVD.

The pickup body is further provided with an objective lens drive mechanism 26 which includes a tracking actuator and a focus actuator. The focus actuator of this objective lens drive mechanism 26 moves the objective lens 4 in a direction perpendicular to the recording surface of the optical disk 5, and the tracking actuator moves the objective lens 4 in the radial direction of the optical disk 5. The objective lens drive mechanism 26 includes a slider mechanism for coarse movement in the radial direction.

The optical pickup apparatus, as apparent from the above, has a common optical system which guides the light beam from each semiconductor laser on the optical disk 5 via the finite objective lens 4 to form a light spot on the recording surface, converges the return light from the light spot via the objective lens 4 and guides the light to the quarter-split light receiving surface PD1.

The holographic optical element 50 is so designed and arranged as to direct the light beams, launched from the semiconductor lasers LD1 and LD2 along a substantially common light path. The holographic optical element 50 has a general shape of a plate with a transparent diffraction grating 50b (which may be a refractive index distribution type or relief type and will be called "diffraction relief" hereinafter) defined on one major surface of a plate 50a which is made of a transparent isotropic or anisotropic material. The diffraction relief 50b of the holographic optical element 50 directly passes the light beams from the semiconductor lasers LD1 and LD2 without demonstrating anything but a diffracting action on the light beams, eliminates coma aberration and spherical aberration of the light reflected on the information recording surface of the optical disk (i.e., return light) and generates a predetermined amount of astigmatism. In addition, the holographic optical element 50 has a lens performance to convert the return light to have a wave surface with varied image forming distances.

Recording and reproduction of this optical pickup apparatus will now be briefly explained. As shown in FIG. 1, in playing back a DVD, the laser beam from the semiconductor laser LD1 is condensed on the optical disk 5 with the numerical aperture NA of 0.6 according to the set distance between the objective lens 4 and the optical disk 5, thereby forming a small light spot. At the time of playing back a CD, or recording or playing back a CD-R, the laser beam from the semiconductor laser LD2 forms a light spot on the optical disk 5 with the numerical aperture NA of 0.47 through the objective lens 4, according to the set distance between the objective lens 4 and the optical disk 5.

Each return light from the light spot on the recording surface of the optical disk 5 enters the holographic optical element 50 via the objective lens 4 and is diffracted there, and an acquired first-order diffraction light component reaches the quarter-split light receiving surface PD1 of the photodetector.

The quarter-split light receiving surface PD1, as shown in FIG. 2, consists of four elements DET1 to DET4 of the first to fourth quadrants, which are arranged adjacent to one another with respect to two perpendicular segmenting lines L1 and L2 and are independent of one another. The quarter-split light receiving surface PD1 is arranged, together with the semiconductor lasers, on the substrate 10 in line so that one of the segmenting lines is parallel to the track direction (also called tangential (TAN) direction) of the recording surface and the other in parallel to the radial (also called RAD direction) of the optical disk. The segmenting lines coincide with the segmenting directions in the case where tracking servo is carried out according to a retardation method (time difference method).

Figure 2A:
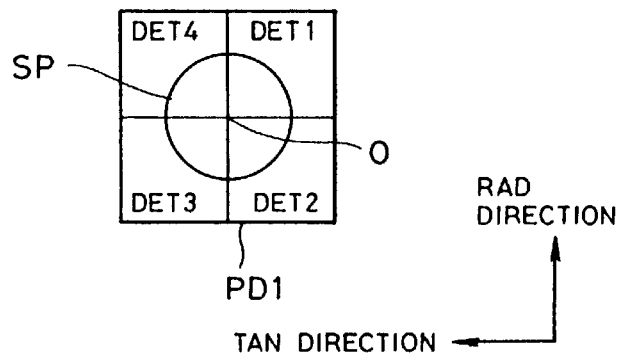
FIGS. 2A through 2C are plan views of a quarter-split light receiving surface of a photodetector in this embodiment.
Figure 2B:
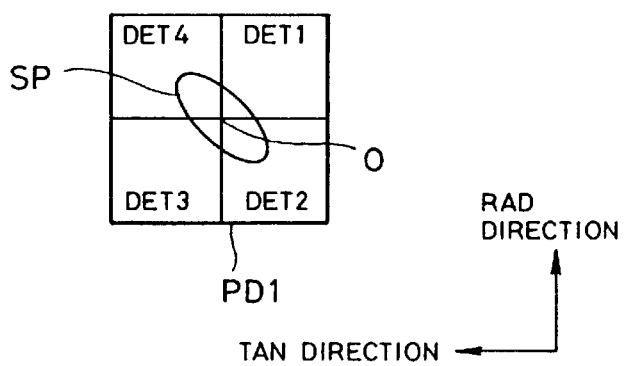
Figure 2C:
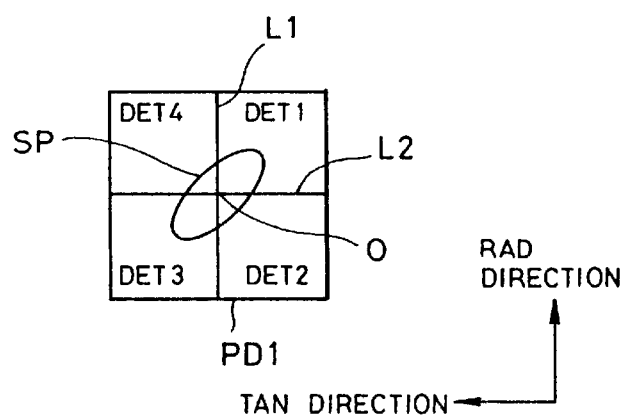

With the light beam in focus on the recording surface, a light spot SP of a complete circle whose intensity distribution is symmetrical with respect to the center O of the quarter-split light receiving surface PD1 or symmetrical in the track direction and radial direction as shown in FIG. 2A is formed on the quarter-split light receiving surface PD1. Therefore, a value acquired by adding the photoelectrically converted outputs of the elements on one diagonal line becomes equal to a value obtained by adding the photoelectrically converted outputs of the elements on the other diagonal line, so that the focus error component becomes "0". With the light beam in out of focus, on the other hand, a light spot SP of an ellipse in a diagonal direction as shown in FIG. 2B or 2C is formed on the quarter-split light receiving surface PD1. Therefore, focus error components acquired by adding the photoelectrically converted outputs of the elements on each diagonal line are opposite in phase. In other words, with DET1 to DET4 denoting the corresponding outputs, (DET1+DET3)−(DET2+DET4) becomes a focus error signal. Further, (DET1+DET4)−(DET2+DET3) becomes a tracking error signal, and DET1+DET2+DET3+DET4 becomes an RF signal.

When a spot image is formed near the center of the quarter-split light receiving surface PD1, the photodetector supplies an electric signal according to the spot image formed on the individual four receiving surfaces to a demodulating circuit 32a and an error detecting circuit 32b. The demodulating circuit 32a produces a record signal based on that electric signal. The error detecting circuit 32b generates a focus error signal, a tracking error signal, other servo signals, etc. based on the electric signal, and supplies the individual drive signals to the respective actuators via an actuator driving circuit 33 to carry out servo control on the objective lens 4 and other associated components in accordance with those drive signals.

Design of Holographic Optical Element

The holographic optical element may be designed in the following manner by a computer aided scheme.

Figure 3:
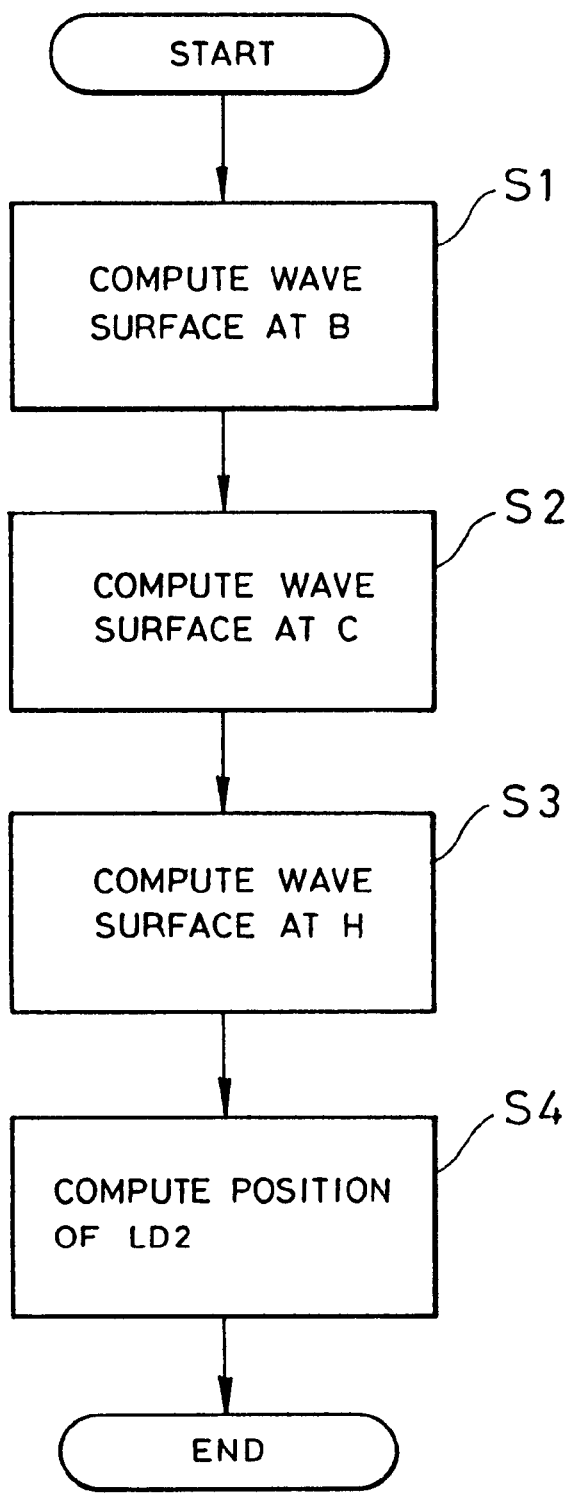
FIG. 3 is a flow chart illustrating how to design a wave surface of a holographic optical element of the optical pickup apparatus according to the first embodiment of this invention.

One way of determining the wave surface of the holographic optical element will be explained with reference to a flow chart in FIG. 3.

Figure 4:
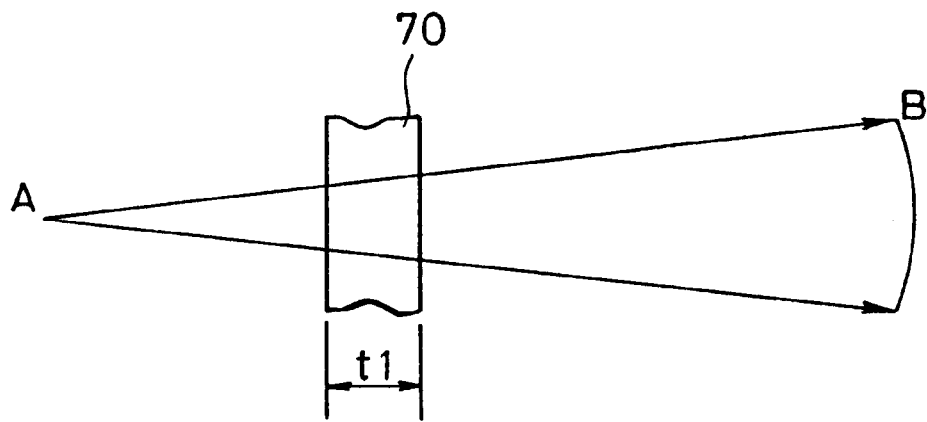
FIG. 4 is a schematic diagram showing the design of a wave surface of the holographic optical element of the optical pickup apparatus according to the first embodiment of this invention.

First, in step S1, it is assumed that a plane-parallel plate 70 (refractive index n) having a thickness t1 is placed, with its optical axis set perpendicularly, in the light path of rays of light (wavelength $\lambda 1$), emitted from one point A corresponding to a semiconductor laser, as shown in FIG. 4. The coordinates of the point A and the initial values for the parameters $\lambda 1$, t1 and n are set.

For the diverging rays after passing the plane-parallel plate 70, its wave surface including spherical aberration at the coordinates of a position B is computed and the result is saved.

The spherical aberration of the diverging rays produced by the plane-parallel plate 70 is corrected and removed in the next step S2. The amount of produced astigmatism can be adjusted by changing the thickness t1 of the plane-parallel plate 70.

Figure 5:
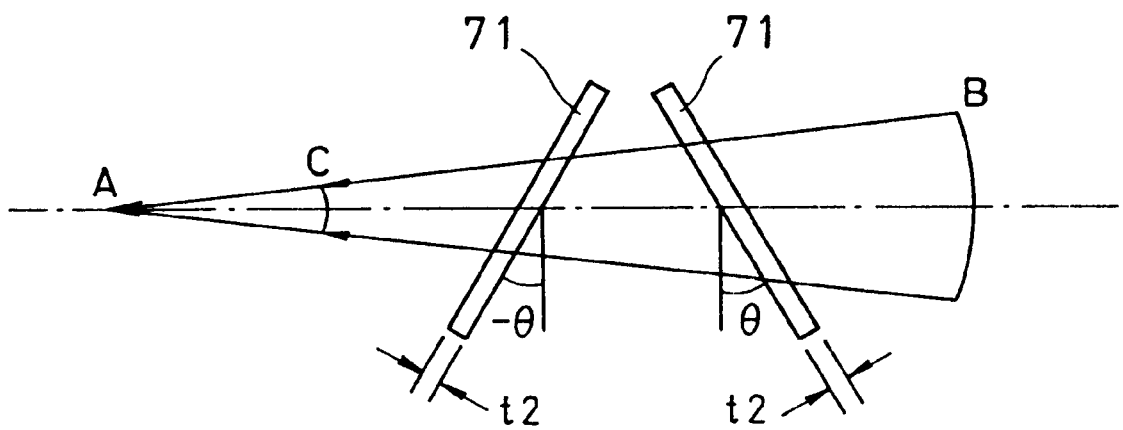
FIG. 5 is a schematic diagram depicting the design of a wave surface of the holographic optical element of the optical pickup apparatus according to the first embodiment of this invention.

In step S2, as the rays are returned in the converging or reverse direction from the saved wave surface at the position B, the rays converge on one point A after passing the plane-parallel plate of the thickness t1, as shown in FIG. 5.

With two plane-parallel plates 71 (refractive index n) of a thickness t2, instead of the plane-parallel plate 70, set apart from each other and inclined at angles of $\ominus$ degrees and $-\ominus$ degrees with respect to a plane perpendicular to the optical axis in such a way as to have a mirror image relation to that plane, the wave surface of rays of light at a position C after passing the plane-parallel plates is computed. For this purpose, the coordinates of the position C and the parameters t2, $\ominus$ and $-\ominus$ are introduced.

In this case, as the rays are returned in the reverse direction from the position B, the wave surface that passes those plane-parallel plates 71 arranged in a pattern like the inverted "V" do not include coma aberration though they have astigmatism and spherical aberration. The spherical aberration can be adjusted by changing the thickness t2 of the plane-parallel plates 71. It is thus possible to cancel out the spherical aberration that has been produced in step S1. This way, it is possible to calculate a wave surface of the rays of light with a predetermined amount of astigmatism but without any coma aberration or spherical aberration at a position C after passing the two plane-parallel plates 71 arranged in a pattern like the inverted "V". The obtained wave surface at the position C will be saved.

Figure 6:
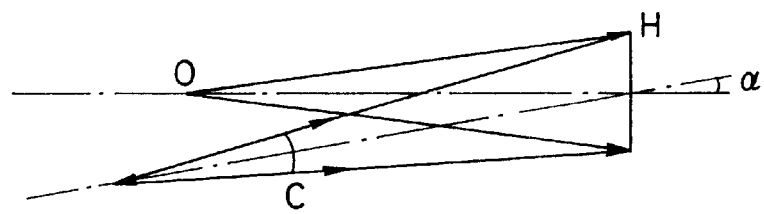
FIG. 6 is a schematic diagram showing the design of a wave surface of the holographic optical element of the optical pickup apparatus according to the first embodiment of this invention.
Figure 7:
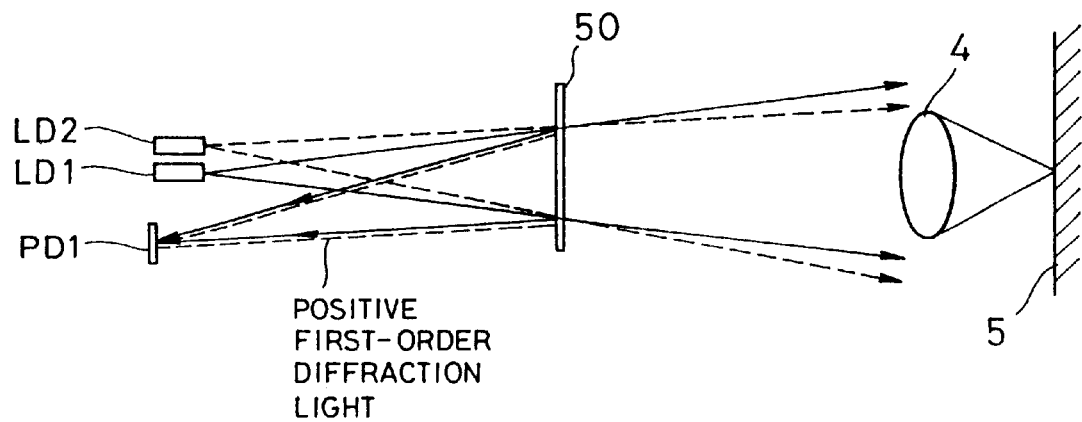
FIG. 7 is a schematic diagram showing the design of an optical system of the optical pickup apparatus according to the first embodiment of this invention.

In the next step S3, a wave surface at a certain inclined (angle $\alpha$) position H of rays of light that are returned again in the reverse direction from the saved wave surface at the position C to diverge, as shown in FIG. 6, is computed. Here, a point on which rays of light converge from the saved wave surface at the position C corresponds to the position of the quarter-split light receiving surface PD1.

At this position H (holographic optical element), interference is caused between the saved wave surface and the wave surface of rays of light (wavelength $\lambda 1$) which diverge from a given point 0 (semiconductor laser LD1), producing interference fringes at that position H. The grating pattern of the holographic optical element of this embodiment can be designed by saving the interference fringes. For this purpose, the coordinates of H and 0 and the parameter a are introduced.

Forming this grating pattern on the transparent substrate can provide the holographic optical element 50 (shown in FIG. 1) which eliminates coma aberration and spherical aberration, produces a predetermined amount of astigmatism and has its image forming distance varied by the lens performance given to the element 50.

In this design example, various optimal values for the holographic optical element can be set by changing the specifications of the semiconductor lasers and the parameters like the wavelength, the distances among the points and the refractive index besides t1 and t2.

As apparent from the above, it is possible to determine the grating pattern of the holographic optical element 50 which passes incident light unaberrated except for astigmatism in a process up to step S3.

The next step S4 designs a system of guiding the diverging light beam from the semiconductor laser LD1 to the objective lens 4 through the holographic optical element 50, then converging the light beam on the optical disk 5, allowing the reflected light to reach the quarter-split light receiving surface PD1 via the objective lens 4 and the holographic optical element 50, and likewise allowing the diverging light beam from the additional semiconductor laser LD2 to reach the quarter-split light receiving surface PD1 in a similar manner.

First, the light beam from the semiconductor laser LD1 of the wavelength $\lambda$ passes the holographic optical element 50 undiffracted, as zero-order diffraction light along the forward path, and in the return path after reflection, the diffraction light is diffracted by the holographic optical element 50 and its positive first-order diffraction light converges on the quarter-split light receiving surface PD1. Here, the holographic optical element 50 passes the light beam of the wavelength $\lambda 1$, launched from the semiconductor laser LD1, guides its zero-order diffraction light to the objective lens 4, receives from the objective lens 4 the return light from the light spot on the recording surface 5, formed by the zero-order diffraction light of the wavelength $\lambda 1$, diffracts the return light, and guides the diffracted first-order diffraction light of the wavelength $\lambda 1$ to the quarter-split light receiving surface PD1.

Meanwhile, the light beam from the semiconductor laser LD2 of the wavelength $\lambda 2$ likewise passes the holographic optical element 50, undiffracted, as zero-order diffraction light in the forward path, but in the return path, the diffraction angle of the diffraction light is changed by the holographic optical element 50 because its wavelength $\lambda 2$ differs from that of the semiconductor laser LD1.

Therefore, with the position of the quarter-split light receiving surface PD1 fixed, the light path of the semiconductor laser LD2 of the wavelength $\lambda 2$ is set by altering the position of the semiconductor laser LD2 on the substrate 10 in such a way that the light beam from the semiconductor laser LD2 comes to the fixed position of the quarter-split light receiving surface PD1.

In short, after setting the positions of the semiconductor laser LD1 and the quarter-split light receiving surface PD1 in the optical system in advance, the position of the semiconductor laser LD2 is set in the above-discussed manner.

Second Embodiment

Figure 8:
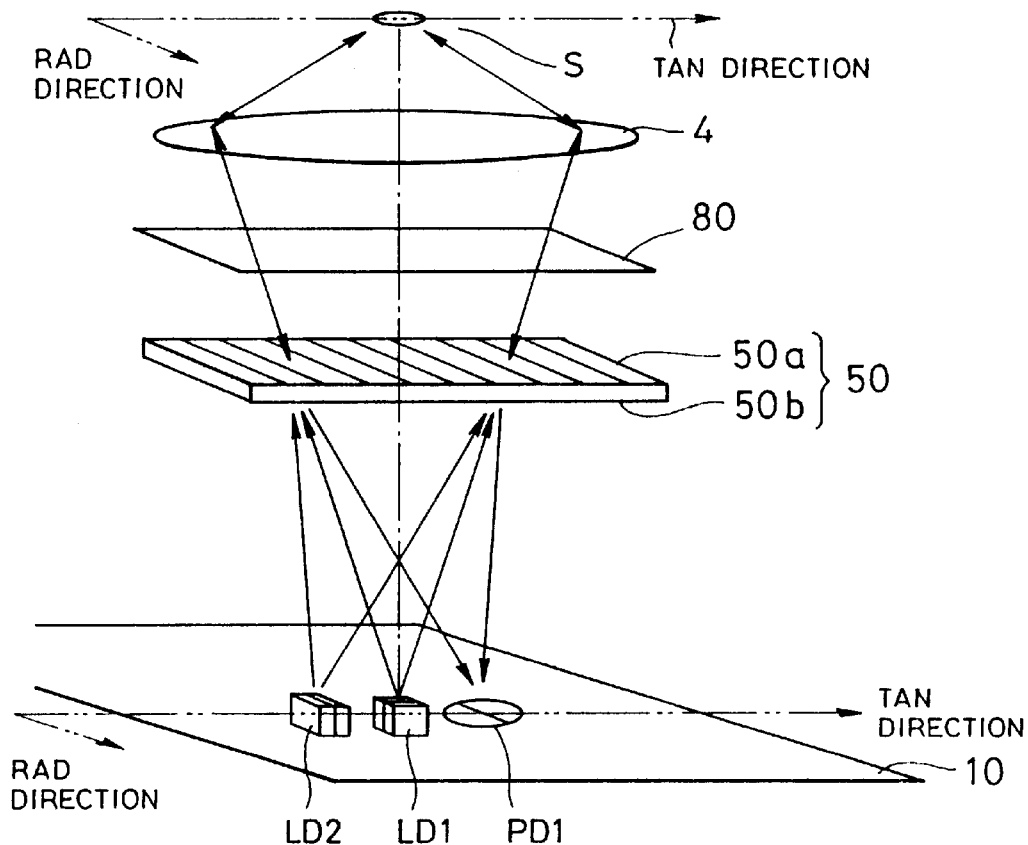
FIG. 8 is a schematic perspective view of the interior of an optical pickup apparatus according to a second embodiment of this invention.

An optical pickup apparatus which is the same as that of the first embodiment, except for the position of the semiconductor laser LD2 on the substrate 10 and an aberration correcting element 80 provided between the holographic optical element 50 and the objective lens 4 as shown in FIG. 8, can be provided by the combination of the semiconductor laser LD1, the quarter-split light receiving surface PD1 and the holographic optical element 50, which are designed by the calculations in the steps S1 to S3.

Let us first consider the case where the light from the semiconductor laser LD2 is diffracted by the holographic optical element 50 to become negative first-order diffraction light and no aberration correcting element 80 is present.

Figure 9:
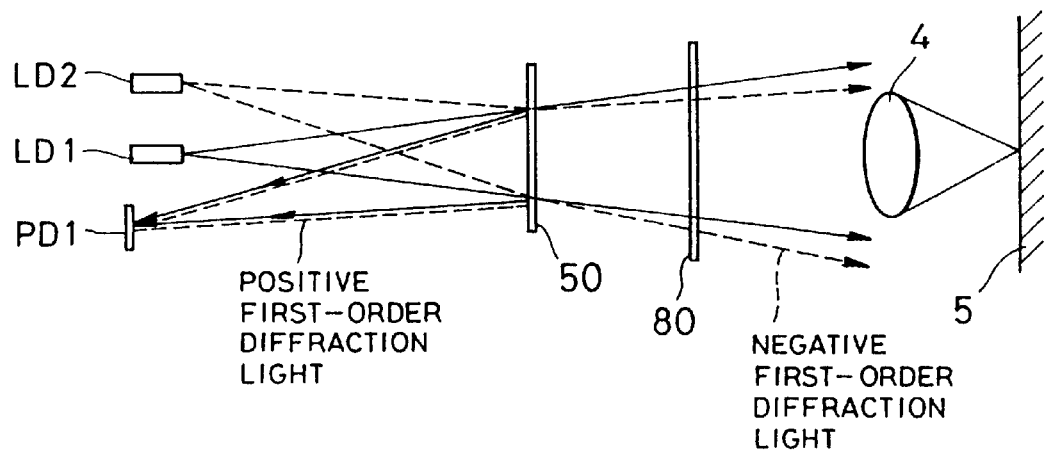
FIG. 9 is a schematic diagram showing the design of an optical system of the optical pickup apparatus according to the second embodiment of this invention.

As shown in FIG. 9, the semiconductor laser LD2 is arranged on the substrate at such a position that the holographic optical element 50 passes the light beam of the wavelength $\lambda 2$, launched from the semiconductor laser LD2, guides its negative first-order diffraction light to the objective lens 4, receives from the objective lens 4 the return light from the light spot on the recording surface 5, formed by the negative first-order diffraction light of the wavelength $\lambda 2$, diffracts the return light, and guides the resulting positive first-order diffraction light of the wavelength $\lambda 2$ to the quarter-split light receiving surface PD1.

Because the holographic optical element 50 is designed by causing interference between the light of the wavelength $\lambda 1$ from the semiconductor laser LD1 and the return light which converges on the quarter-split light receiving surface PD1, the negative first-order diffraction light of the light of the wavelength $\lambda 2$ from the semiconductor laser LD2 will have aberration in the forward path between the holographic optical element 50 and the objective lens 4.

To correct this aberration, the aberration correcting element 80 is arranged between the holographic optical element 50 and the objective lens 4. This aberration correcting element 80 does not act at all when the light beam from the semiconductor laser LD1 passes there, and converts the light from the semiconductor laser LD2 which has passed the holographic optical element 50 to unaberrated light. That is, the aberration correcting element 80 passes the light beam of the wavelength $\lambda 2$, launched from the semiconductor laser LD2, eliminates aberration from the light beam and guides the resultant light beam to the objective lens 4, while taking no action on the light beam of the wavelength $\lambda 1$.

Figure 17:
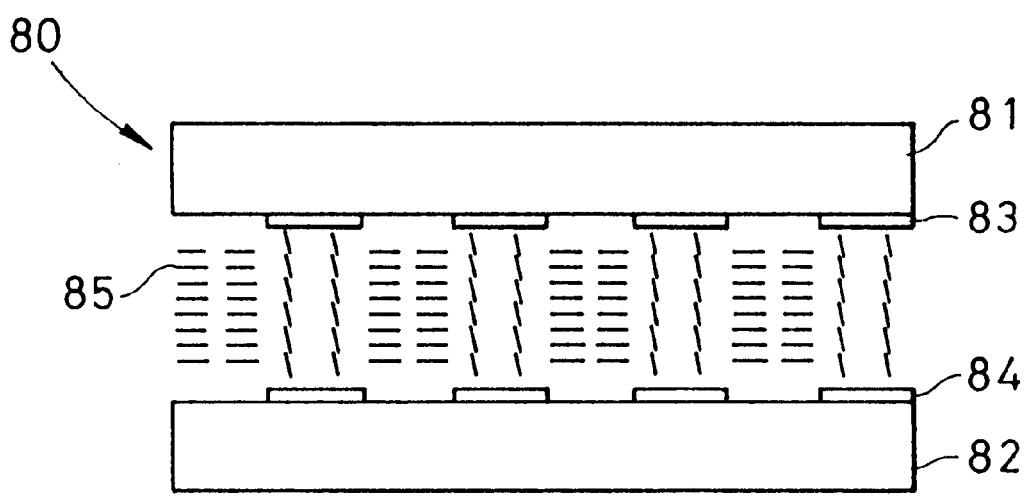
FIG. 17 is a schematic partly cross-sectional view of an aberration correcting element of the optical pickup apparatus according to the second embodiment of this invention.

This aberration correcting element 80 can be realized by electrically switching a liquid crystal device as shown in FIG. 17.

The liquid crystal type aberration correcting element 80 in FIG. 17 has transparent electrodes 83 and 84 a pattern corresponding to an aberration correcting wave surface on the respective inner surfaces of a pair of transparent glass substrates 81 and 82, and a liquid crystal layer 85 provided between the transparent electrodes 83 and 84. When a voltage is applied to the liquid crystal layer 85 via the transparent electrodes 83 and 84, liquid crystal molecules are inclined from the state where no voltage is applied. Using this phenomenon, the aberration correcting element 80 can selectively be rendered to act, or not to act, on the rays of light of the wavelengths $\lambda 1$ and $\lambda 2$ from the semiconductor lasers LD1 and LD2. When the polarization direction of the incident light is perpendicular to the alignment of the liquid crystal molecules, for example, no diffraction occurs and the element 80 does not operate as a liquid crystal type aberration correcting element. When the polarization direction of the incident light is parallel to the alignment of the liquid crystal molecules, on the other hand, diffraction occurs and the aberration correcting element 80 acts as a liquid crystal type aberration correcting element. That is, selective application of a voltage or no voltage sets the inclined and uninclined portions of the liquid crystal molecules into a pattern corresponding to the aberration correcting wave surface, resulting in variations in the refractive index of the liquid crystal layer and the length of the light path of the incident light, so that the element 80 works as an aberration correcting element. The reverse setting is also possible. Furthermore, because the inclination of the liquid crystal molecules can be controlled in accordance with the voltage applied to the liquid crystal layer, the amount of aberration correction of the aberration correcting element can be controlled arbitrarily.

Figure 18:
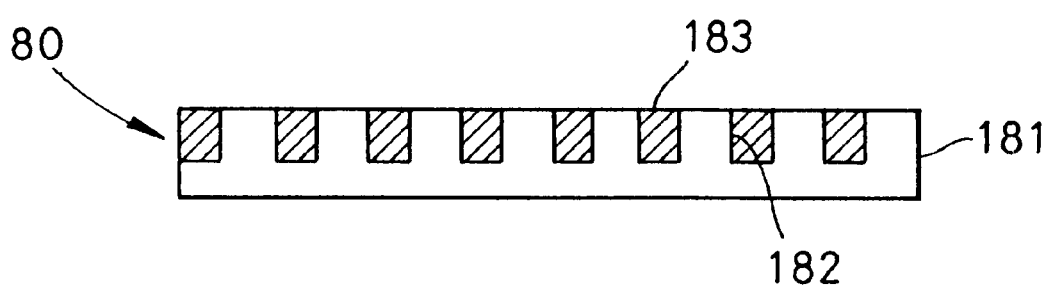
FIG. 18 is a schematic partly cross-sectional view showing another aberration correcting element of the optical pickup apparatus according to the second embodiment of this invention.

If, as shown in FIG. 18, a wavelength-selectable non-linear optical material like lithium niobate is used for a transparent substrate 181, and the pattern corresponding to the aberration correcting wave surface is etched to form recesses 182, which are then filled with an isotropic optical material 183 whose refractive index is equal to the refractive index of extraordinary ray or the refractive index of ordinary ray of the non-linear optical material, it is possible to select the enabled state or the disabled state of the non-linear optical material type aberration correcting element 80 depending on the difference in wavelength, $\lambda 1$ or $\lambda 2$, between the semiconductor lasers LD1 and LD2.

Specific procedures for designing this optical system will be discussed below. First, the optimal shape of the grating pattern of the holographic optical element 50 is designed through the calculations in the steps S1 to S3 among the steps shown in FIG. 10 using the semiconductor laser LD1 and the quarter-split light receiving surface PD1.

In step S5, the wave surface of the diverging rays of light from the semiconductor laser LD2, located at a given coordinate position, on the holographic optical element 50 (negative first-order diffraction) is obtained by ray-tracing using the high refractive index method and the phase function method, followed by the acquisition of the wave surface on the aberration correcting element 80, to thereby compute the amount of aberration correction of the aberration correcting element 80.

In step S6, the wave surface of the diverging rays of light from the semiconductor laser LD2 on the holographic optical element 50 (negative first-order diffraction), the wave surface of the diverging rays on the aberration correcting element 80, the wave surface of the diverging rays on the objective lens, the wave surface of the diverging rays on the recording surface of the optical disk, the wave surface of the reflected light on the objective lens, the wave surface of the reflected light on the aberration correcting element 80, the wave surface of the reflected light on the holographic optical element 50 (positive first-order diffraction), and the wave surface of the reflected light on the quarter-split light receiving surface PD1 are computed in order.

In step S7, with the coordinate position of the semiconductor laser LD2 changed, the amount of aberration on the quarter-split light receiving surface PD1 is computed and is saved. In step S8, the computed aberration amount is compared with a predetermined threshold value, and when the former exceeds the latter, the flow returns to step S5 to repeat the computation with the coordinate position of the semiconductor laser LD2 changed. When the computed aberration amount becomes equal to or smaller than the threshold value, the process is terminated. The position of the semiconductor laser LD2 which minimizes the unnecessary aberration on the quarter-split light receiving surface PD1 is acquired in the above manner.

Further, the optical system of the second embodiment may also be implemented by setting a loop R1 extending from this step S8 to step S1 so that while the position of the semiconductor laser LD1 on the optical axis and/or the position of the quarter-split light receiving surface PD1 is changed in steps S1–S3, the position of the semiconductor laser LD2 which minimizes the unnecessary aberration on the quarter-split light receiving surface PD1 is acquired in steps S5–S7, and the steps S1–S8 are repeated until the acquired position of the semiconductor laser LD2 leads to the minimized aberration or until the amount of aberration becomes equal to or smaller than the predetermined threshold value.

Third Embodiment

Figure 11:
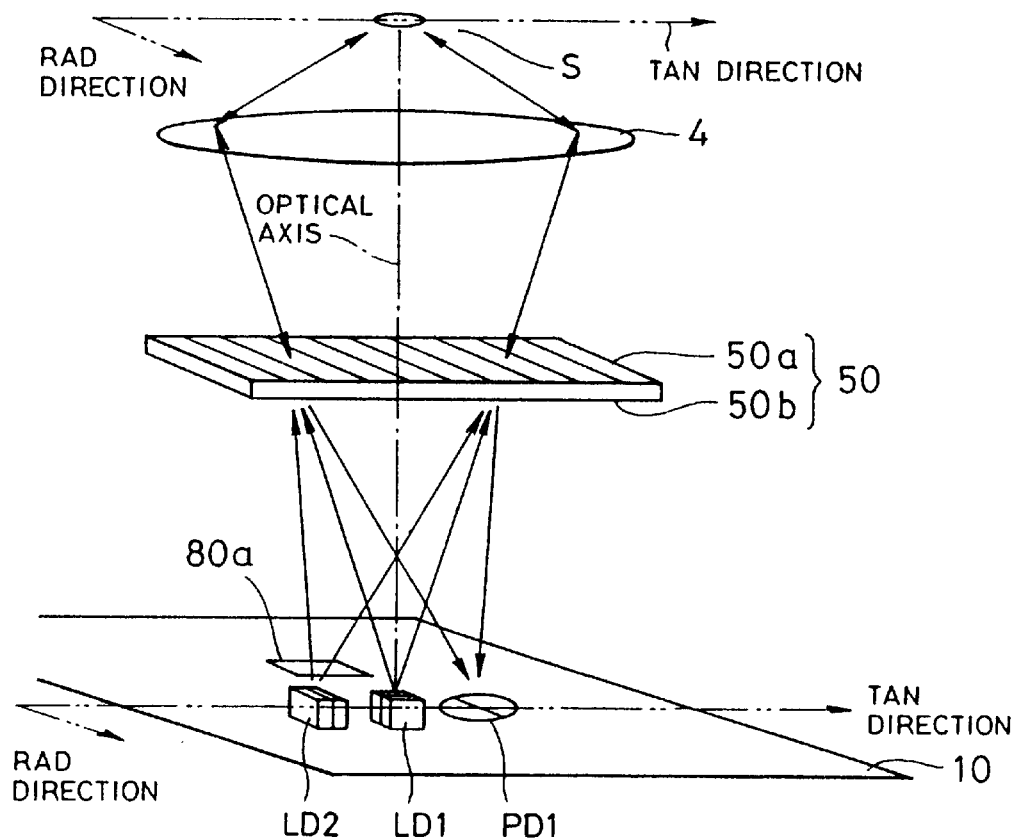
FIG. 11 is a schematic perspective view of the interior of an optical pickup apparatus according to a third embodiment of this invention.

An optical pickup apparatus which is the same as that of the second embodiment, except for a light-source side aberration correcting element 80a instead of the aberration correction element 80 provided between the semiconductor laser LD2 and the holographic optical element as shown in FIG. 11, can be provided as per the second embodiment.

Figure 12:
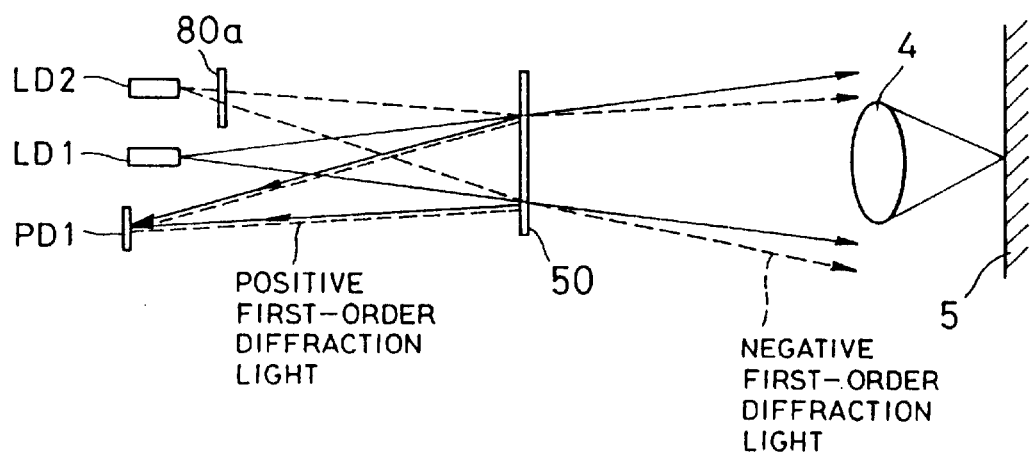
FIG. 12 is a schematic diagram showing the design of an optical system of the optical pickup apparatus according to the third embodiment of this invention.

As shown in FIG. 12, in the forward path, the light-source side aberration correcting element 80a, located between the semiconductor laser LD2 and the holographic optical element 50, passes the light beam of the wavelength $\lambda 2$, launched from the semiconductor laser LD2, and gives this light beam such aberration as to cancel aberration, which occurs at the time the light beam passes the holographic optical element 50, to thereby eliminate aberration from the light beam of the wavelength $\lambda 2$ which has passed the holographic optical element 50. When this light-source side aberration correcting element 80a is placed between the semiconductor laser LD2 and the holographic optical element 50, the parameters of the semiconductor laser LD1 become irrelevant at the design phase.

Fourth Embodiment

Figure 13:
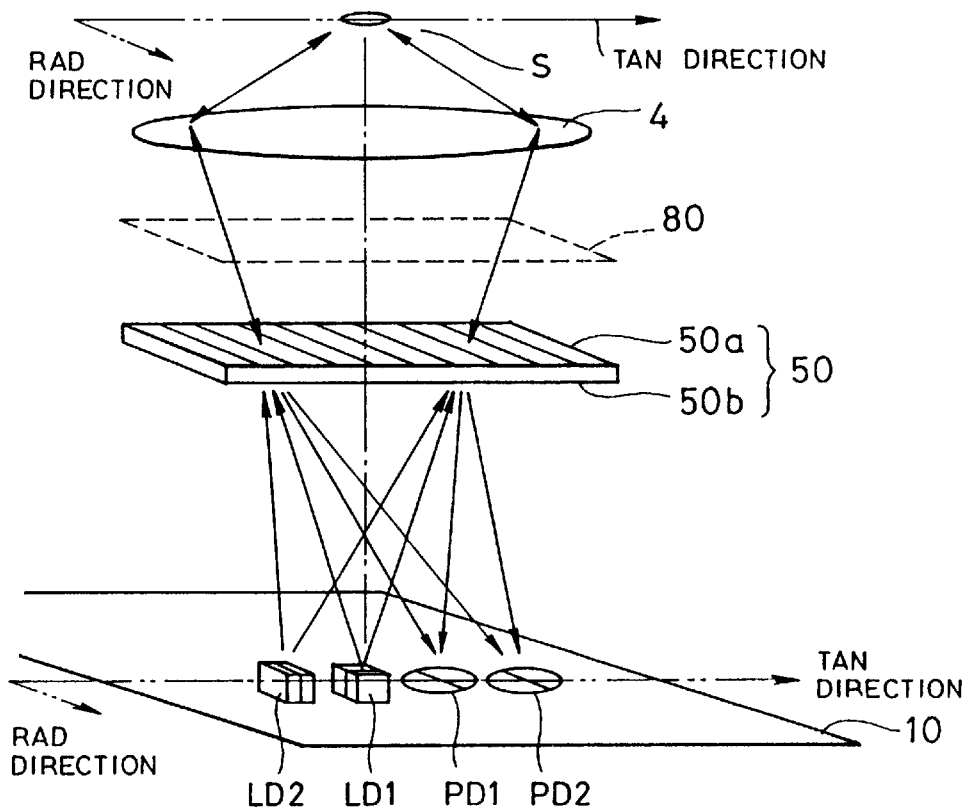
FIG. 13 is a schematic perspective view depicting the interior of an optical pickup apparatus according to a fourth embodiment of this invention.

An optical pickup apparatus which is the same as that of the first embodiment, except for the additional provision of a quarter-split light receiving surface PD2 as shown in FIG. 13, can be provided by the combination of the semiconductor laser LD1, the quarter-split light receiving surface PD1 and the holographic optical element 50, which are designed by the calculations in the steps S1 to S3.

In this case, the light beam from the semiconductor laser LD2 of the wavelength $\lambda 2$ likewise passes the holographic optical element 50 unaberrated as zero-order diffraction light. The semiconductor laser LD2 and the second quarter-split light receiving surface PD2 are arranged in such a manner that in the return path, the holographic optical element 50 diffracts the zero-order diffraction light of the second wavelength of the return light that has traveled through the recording surface and guides the positive first-order diffraction light, acquired by the diffraction, to the second quarter-split light receiving surface PD2.

As apparent from the above, the positions of the set of the f first semiconductor laser LD1 and the quarter-split light receiving surface PD1 in the optical system are set first, followed by the setting of the positions of the set of the semiconductor laser LD2 and the second quarter-split light receiving surface PD2.

It is also possible to provide a pickup apparatus that has the aberration correcting element 80 as shown by a broken line in FIG. 13, which is located between the holographic optical element and the objective lens and does not act on the light beam of the wavelength $\lambda 1$, as per the second embodiment, except for the additional provision of the second quarter-split light receiving surface PD2. The second quarter-split light receiving surface PD2 is arranged on the substrate 10 at such a position that the holographic optical element 50 receives from the objective lens 4 the return light from the light spot on the recording surface 5, which has been formed by the negative first-order diffraction light of the wavelength $\lambda 2$, diffracts the return light and guides the resulting first-order diffraction light of the wavelength λ2 to the quarter-split light receiving surface PD2.

Figure 14:
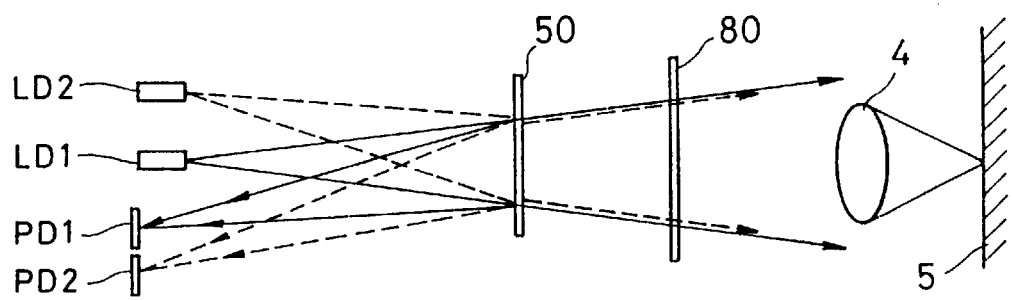
FIG. 14 is a schematic diagram showing the design of an optical system of the optical pickup apparatus according to the fourth embodiment of this invention.

With the aberration correcting element 80 provided, as shown in FIG. 14, the semiconductor laser LD1, the quarter-split light receiving surface PD1 and the holographic optical element 50 are arranged in such a way that the holographic optical element 50 passes the light beam of the wavelength λ1, launched from the semiconductor laser LD1, guides its zero-order diffraction light to the objective lens 4, receives from the objective lens 4 the return light from the light spot on the recording surface 5 formed by the zero-order diffraction light of the wavelength λ1, diffracts the return light, and guides the resulting first-order diffraction light of the wavelength λ1 to the quarter-split light receiving surface PD1.

The semiconductor laser LD2 is arranged on the substrate 10 at such a position that the holographic optical element 50 passes the light beam of the wavelength λ2, launched from the semiconductor laser LD2, and guides its negative first-order diffraction light to the objective lens 4 along substantially the same light path as the zero-order diffraction light of the light beam of the wavelength λ1.

As in the second embodiment, the aberration correcting element 80 which does not act on the light beam of the wavelength λ1 is arranged between the holographic optical element 50 and the objective lens 4. This aberration correcting element 80 passes the light beam of the wavelength λ2, launched from the semiconductor laser LD2, eliminates aberration from this light beam and guides the resultant light to the objective lens 4.

As is readily understood from the above, the light from the semiconductor laser LD2 is diffracted by the holographic optical element 50 to be negative first-order diffraction light, which travels along the same light path as the light from the semiconductor laser LD1 that travels, undiffracted, toward the objective lens 4. The return light of the light of the wavelength λ2 from the semiconductor laser LD2 converges on the second quarter-split light receiving surface PD2 because the diffraction angle at the holographic optical element 50 differs from that of the light from the semiconductor laser LD1 of the wavelength λ1.

Figure 10:
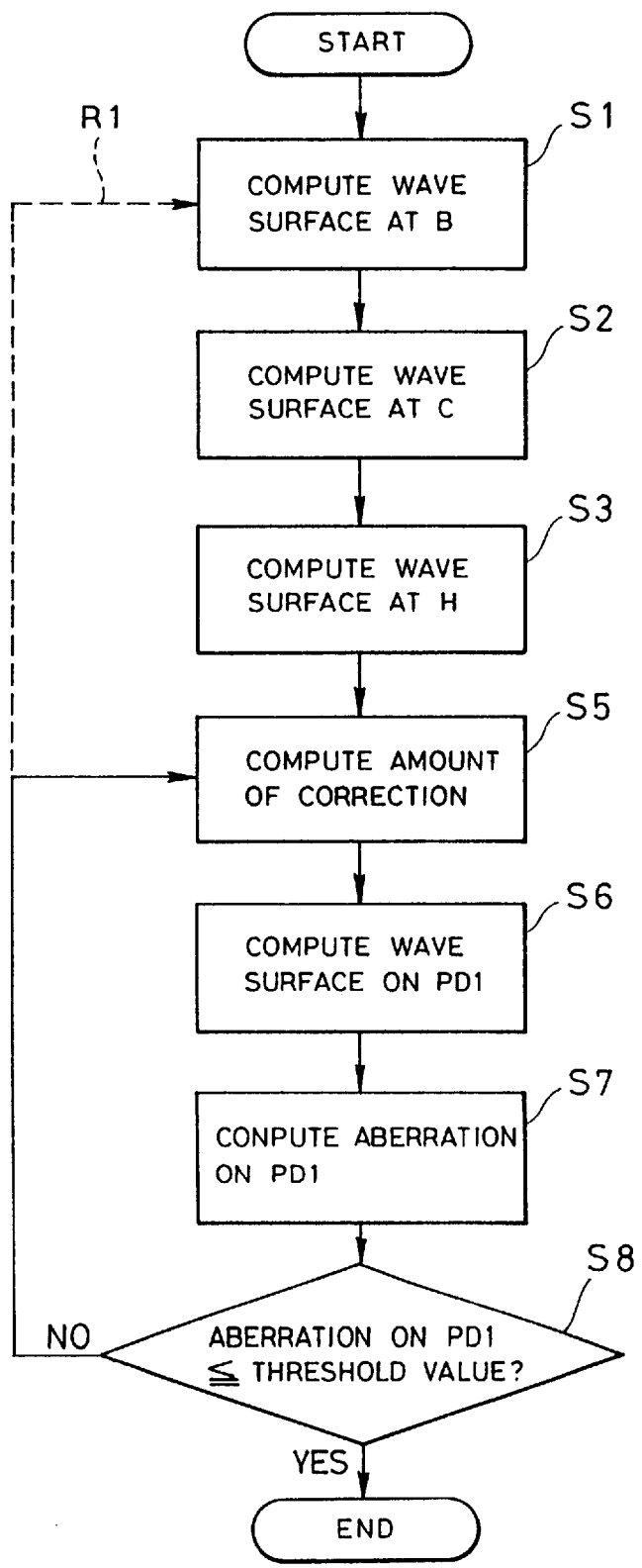
FIG. 10 is a flow chart illustrating the design of the optical system of the optical pickup apparatus according to the second embodiment of this invention.

Specific procedures for designing this optical system are similar to those of the second embodiment illustrated in FIG. 10, except that the optimal designs of the amount of aberration and the wave surface of the return light on the second quarter-split light receiving surface PD2 are carried out in the steps S5 and S6 instead of those on the quarter-split light receiving surface PD1.

Fifth Embodiment

Figure 15:
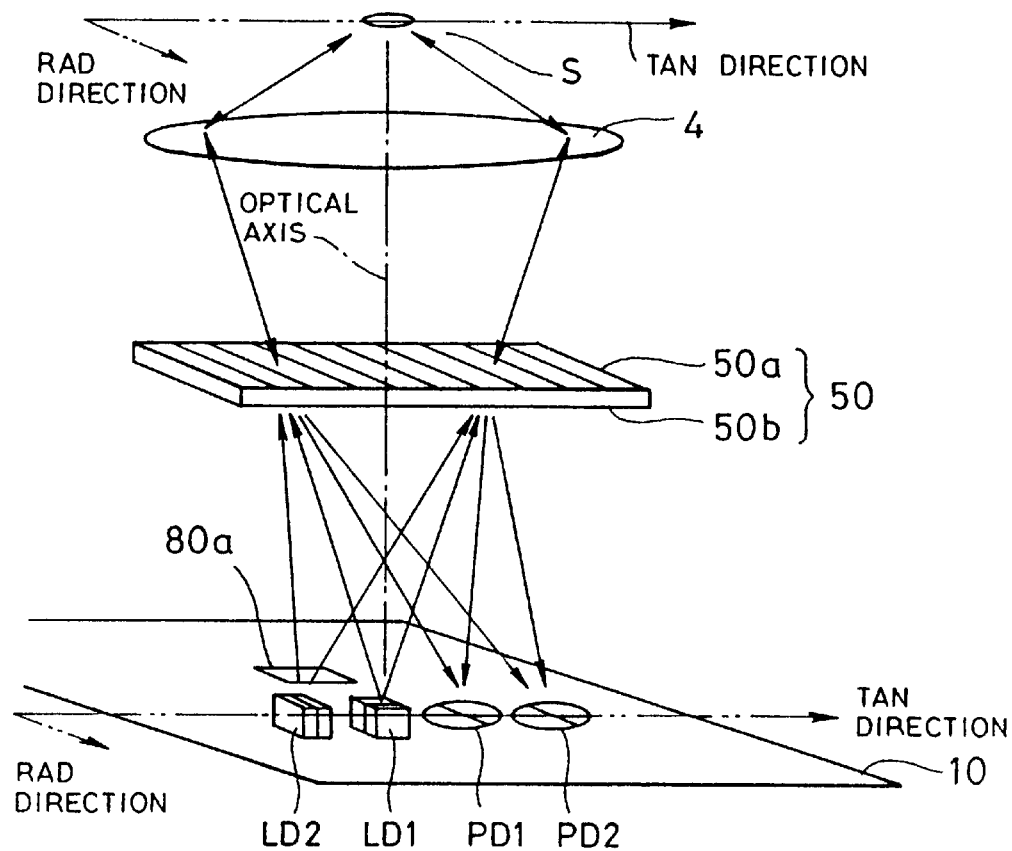
FIG. 15 is a schematic perspective view of the interior of an optical pickup apparatus according to a fifth embodiment of this invention.

An optical pickup apparatus which is the same as that of the fourth embodiment, except for the provision of a light-source side aberration correcting element 80a between the semiconductor laser LD2 and the holographic optical element 50, as shown in FIG. 15.

Figure 16:
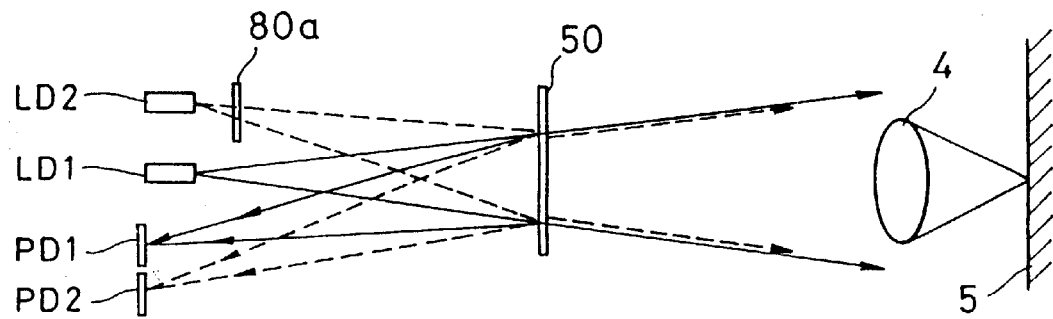
FIG. 16 is a schematic diagram showing the design of an optical system of the optical pickup apparatus according to the fifth embodiment of this invention.

As shown in FIG. 16, in the forward path, the light-source side aberration correcting element 80a, located between the semiconductor laser LD2 and the holographic optical element 50, passes the light beam of the wavelength λ2 launched from the semiconductor laser LD2, gives this light beam such aberration as to cancel aberration, which occurs at the time the light beam passes the holographic optical element 50, to thereby eliminate aberration from the light beam of the wavelength λ2 which has passed the holographic optical element 50. When this light-source side aberration correcting element 80a is placed between the semiconductor laser LD2 and the holographic optical element 50, the parameters of the semiconductor laser LD1 become irrelevant at the design phase.

Although it is premised in the foregoing description that the objective lens of the optical pickup apparatus of this invention is a finite type, it should be apparent to those skilled in the art that such an objective lens may be replaced with an infinite objective lens, implemented by arranging a condenser lens on an optical recording medium side and arranging a collimator lens on the semiconductor laser side, without sacrificing the advantages.

What is claimed is:

1. An optical pickup apparatus for reading recorded information from an optical recording medium, said optical pickup apparatus including an optical system which comprises:

a single light intensity detection device having a quarter-split light receiving surface;

two semiconductor lasers for emitting light beams of different wavelengths;

an objective lens for directing each of said light beams onto an optical recording medium to form a light spot on a recording surface; and a holographic optical element located between said quarter-split light receiving surface and said objective lens, wherein said holographic optical element is operative to eliminate coma aberration and spherical aberration of a light beam traveled through said recording surface and said objective lens, thereby generating a predetermined amount of astigmatism.

2. The optical pickup apparatus according to claim 1, wherein said holographic optical element further has a lens performance for converging a light beam, traveled through said recording surface and said objective lens, onto said quarter-split light receiving surface.

3. The optical pickup apparatus according to claim 2, wherein said holographic optical element passes a light beam of a first wavelength launched from one of said semiconductor lasers, guides zero-order diffraction light of said light beam to said objective lens, diffracts said zero-order diffraction light of said first wavelength traveled through said recording surface, and guides positive first-order diffraction light, acquired by diffraction, to said quarter-split light receiving surface.

4. The optical pickup apparatus according to claim 1, wherein said holographic optical element passes a light beam of a first wavelength launched from one of said semiconductor lasers, guides zero-order diffraction light of said light beam to said objective lens, diffracts said zero-order diffraction light of said first wavelength traveled through said recording surface, and guides positive first-order diffraction light, acquired by diffraction, to said quarter-split light receiving surface.

5. An optical pickup apparatus for reading recorded information from an optical recording medium, said optical pickup apparatus including an optical system which comprises:

a single light intensity detection device having a quarter-split light receiving surface;

two semiconductor lasers for emitting light beams of different wavelengths;

an objective lens for directing each of said light beams onto an optical recording medium to form a light spot on a recording surface; and a holographic optical element located between said quarter-split light receiving surface and said objective lens, wherein said holographic optical element is operative to eliminate coma aberration and spherical aberration of a light beam traveled through said recording surface and said objective lens, thereby generating a predetermined amount of astigmatism, wherein said holographic optical element passes a light beam of a first wavelength launched from one of said semiconductor lasers, guides zero-order diffraction light of said light beam to said objective lens, diffracts said zero-order diffraction light of said first wavelength traveled through said recording surface, and guides positive first-order diffraction light, acquired by diffraction, to said quarter-split light receiving surface, and wherein the other one of said semiconductor lasers is located at such a position that said holographic optical element passes a light beam of a second wavelength launched from said other semiconductor laser, guides zero-order diffraction light of said light beam to said objective lens, diffracts said zero-order diffraction light of said second wavelength traveled through said recording surface, and guides positive first-order diffraction light, acquired by diffraction, to said quarter-split light receiving surface.

6. An optical pickup apparatus for reading recorded information from an optical recording medium, said optical pickup apparatus including an optical system which comprises:

a single light intensity detection device having a quarter-split light receiving surface;

two semiconductor lasers for emitting light beams of different wavelengths;

an objective lens for directing each of said light beams onto an optical recording medium to form a light spot on a recording surface; and a holographic optical element located between said quarter-split light receiving surface and said objective lens, wherein said holographic optical element is operative to eliminate coma aberration and spherical aberration of a light beam traveled through said recording surface and said objective lens, thereby generating a predetermined amount of astigmatism, wherein said holographic optical element passes a light beam of a first wavelength launched from one of said semiconductor lasers, guides zero-order diffraction light of said light beam to said objective lens, diffracts said zero-order diffraction light of said first wavelength traveled through said recording surface, and guides positive first-order diffraction light, acquired by diffraction, to said quarter-split light receiving surface, and wherein the other one of said semiconductor lasers is located at such a position that said holographic optical element passes a light beam of a second wavelength launched from said other semiconductor laser, guides negative first-order diffraction light of said light beam to said objective lens, receives return light from a light spot on said recording surface, produced by said negative first-order diffraction light of said second wavelength, from said objective lens, diffracts said return light, and guides positive first-order diffraction light of said second wavelength, acquired by diffraction, to quarter-split light receiving surface; and said optical system further includes an aberration correcting element, located between said holographic optical element and said objective lens, for passing said light beam of said second wavelength launched from said other semiconductor laser without acting on said light beam of said first wavelength, and guiding said light beam of said second wavelength to said objective lens while eliminating aberration from said light beam of said second wavelength.

7. The optical pickup apparatus according to claim 6, wherein said aberration correcting element is a liquid crystal type aberration correcting element having transparent electrodes formed on inner surfaces of a pair of transparent glass substrates in a pattern corresponding to an aberration correcting wave surface, and a liquid crystal layer provided between said transparent electrodes, and can be enabled or disabled selectively by applying a voltage to said transparent electrodes in association with switching between said semiconductor lasers.

8. The optical pickup apparatus according to claim 6, wherein said aberration correcting element is an aberration correcting element of a non-linear optical material type having a transparent substrate of a wavelength-selectable non-linear optical material and an isotropic optical material, filled in recesses formed on said transparent substrate and having a pattern corresponding to an aberration correcting wave surface, and having a refractive index equal to a refractive index of extraordinary ray or a refractive index of ordinary ray of said non-linear optical material, and can be enabled or disabled selectively by applying a voltage to said transparent electrodes in association with switching between said semiconductor lasers.

9. An optical pickup apparatus for reading recorded information from an optical recording medium, said optical pickup apparatus including an optical system which comprises:

a single light intensity detection device having a quarter-split light receiving surface;

two semiconductor lasers for emitting light beams of different wavelengths;

an objective lens for directing each of said light beams onto an optical recording medium to form a light spot on a recording surface; and a holographic optical element located between said quarter-split light receiving surface and said objective lens, wherein said holographic optical element is operative to eliminate coma aberration and spherical aberration of a light beam traveled through said recording surface and said objective lens, thereby generating a predetermined amount of astigmatism, wherein said holographic optical element passes a light beam of a first wavelength launched from one of said semiconductor lasers, guides zero-order diffraction light of said light beam to said objective lens, diffracts said zero-order diffraction light of said first wavelength traveled through said recording surface, and guides positive first-order diffraction light, acquired by diffraction, to said quarter-split light receiving surface, and wherein the other one of said semiconductor lasers is located at such a position that said holographic optical element passes a light beam of a second wavelength launched from said other semiconductor laser, guides negative first-order diffraction light of said light beam to said objective lens, receives return light from a light spot on said recording surface, produced by said negative first-order diffraction light of said second wavelength, from said objective lens, diffracts said return light, and guides positive first-order diffraction light of said second wavelength, acquired by diffraction, to said quarter-split light receiving surface; and said optical system further includes a light-source side aberration correcting element, located between said other semiconductor laser and said holographic optical element, for passing said light beam of said second wavelength launched from said other semiconductor laser, giving said light beam of said second wavelength such aberration as to cancel aberration, which occurs at a time said light beam of said second wavelength passes said holographic optical element, and guiding said light beam of said second wavelength to said holographic optical element, thereby eliminating aberration from said light beam of said second wavelength having passed said holographic optical element.

10. The optical pickup apparatus according to claim 9, wherein said aberration correcting element is a liquid crystal type aberration correcting element having transparent electrodes formed on inner surfaces of a pair of transparent glass substrates in a pattern corresponding to an aberration correcting wave surface, and a liquid crystal layer provided between said transparent electrodes, and can be enabled or disabled selectively by applying a voltage to said transparent electrodes in association with switching between said semiconductor lasers.

11. The optical pickup apparatus according to claim 9, wherein said aberration correcting element is an aberration correcting element of a non-linear optical material type having a transparent substrate of a wavelength-selectable non-linear optical material and an isotropic optical material, filled in recesses formed on said transparent substrate and having a pattern corresponding to an aberration correcting wave surface, and having a refractive index equal to a refractive index of extraordinary ray or a refractive index of ordinary ray of said non-linear optical material, and can be enabled or disabled selectively by applying a voltage to said transparent electrodes in association with switching between said semiconductor lasers.

12. An optical pickup apparatus for reading recorded information from an optical recording medium, said optical pickup apparatus including an optical system which comprises:
  a single light intensity detection device having a quarter-split light receiving surface;
  two semiconductor lasers for emitting light beams of different wavelengths;
  an objective lens for directing each of said light beams onto an optical recording medium to form a light spot on a recording surface; and
  a holographic optical element located between said quarter-split light receiving surface and said objective lens, wherein said holographic optical element is operative to eliminate coma aberration and spherical aberration of a light beam traveled through said recording surface and said objective lens, thereby generating a predetermined amount of astigmatism, wherein said holographic optical element passes a light beam of a first wavelength launched from one of said semiconductor lasers, guides zero-order diffraction light of said light beam to said objective lens, diffracts said zero-order diffraction light of said first wavelength traveled through said recording surface, and guides positive first-order diffraction light, acquired by diffraction, to said quarter-split light receiving surface, and
  wherein said optical system further includes a second quarter-split light receiving surface; and
  the other one of said semiconductor lasers is located at such a position that said holographic optical element passes a light beam of a second wavelength launched from said other semiconductor laser, guides zero-order diffraction light of said light beam to said objective lens, diffracts said zero-order diffraction light of said second wavelength traveled through said recording surface, and guides positive first-order diffraction light, acquired by diffraction, to said second quarter-split light receiving surface.

13. An optical pickup apparatus for reading recorded information from an optical recording medium, said optical pickup apparatus including an optical system which comprises:
  a single light intensity detection device having a quarter-split light receiving surface;
  two semiconductor lasers for emitting light beams of different wavelengths;
  an objective lens for directing each of said light beams onto an optical recording medium to form a light spot on a recording surface; and
  a holographic optical element located between said quarter-split light receiving surface and said objective lens, wherein said holographic optical element is operative to eliminate coma aberration and spherical aberration of a light beam traveled through said recording surface and said objective lens, thereby generating a predetermined amount of astigmatism, wherein said holographic optical element passes a light beam of a first wavelength launched from one of said semiconductor lasers, guides zero-order diffraction light of said light beam to said objective lens, diffracts said zero-order diffraction light of said first wavelength traveled through said recording surface, and guides positive first-order diffraction light, acquired by diffraction, to said quarter-split light receiving surface, and
  wherein said optical system further includes a second quarter-split light receiving surface; and
  the other one of said semiconductor lasers is located at such a position that said holographic optical element passes a light beam of a second wavelength launched from said other semiconductor laser, guides negative first-order diffraction light of said light beam to said objective lens, receives return light from a light spot on said recording surface, produced by said negative first-order diffraction light of said second wavelength, from said objective lens, diffracts said return light, and guides positive first-order diffraction light of said second wavelength, acquired by diffraction, to said second quarter-split light receiving surface; and
  said optical system further includes an aberration correcting element, located between said holographic optical element and said objective lens, for passing said light beam of said second wavelength launched from said other semiconductor laser without acting on said light beam of said first wavelength, and guiding said light beam of said second wavelength to said objective lens while eliminating aberration from said light beam of said second wavelength.

14. The optical pickup apparatus according to claim 13, wherein said aberration correcting element is a liquid crystal type aberration correcting element having transparent electrodes formed on inner surfaces of a pair of transparent glass substrates in a pattern corresponding to an aberration correcting wave surface, and a liquid crystal layer provided between said transparent electrodes, and can be enabled or disabled selectively by applying a voltage to said transparent electrodes in association with switching between said semiconductor lasers.

15. The optical pickup apparatus according to claim 13, wherein said aberration correcting element is an aberration correcting element of a non-linear optical material type having a transparent substrate of a wavelength-selectable non-linear optical material and an isotropic optical material, filled in recesses formed on said transparent substrate and having a pattern corresponding to an aberration correcting wave surface, and having a refractive index equal to a refractive index of extraordinary ray or a refractive index of ordinary ray of said non-linear optical material, and can be enabled or disabled selectively by applying a voltage to said transparent electrodes in association with switching between said semiconductor lasers.

16. An optical pickup apparatus for reading recorded information from an optical recording medium, said optical pickup apparatus including an optical system which comprises:

a single light intensity detection device having a quarter-split light receiving surface;

two semiconductor lasers for emitting light beams of different wavelengths;

an objective lens for directing each of said light beams onto an optical recording medium to form a light spot on a recording surface; and a holographic optical element located between said quarter-split light receiving surface and said objective lens, wherein said holographic optical element is operative to eliminate coma aberration and spherical aberration of a light beam traveled through said recording surface and said objective lens, thereby generating a predetermined amount of astigmatism, wherein said holographic optical element passes a light beam of a first wavelength launched from one of said semiconductor lasers, guides zero-order diffraction light of said light beam to said objective lens, diffracts said zero-order diffraction light of said first wavelength traveled through said recording surface, and guides positive first-order diffraction light, acquired by diffraction, to said quarter-split light receiving surface, and wherein said optical system further includes a second quarter-split light receiving surface;

the other one of said semiconductor lasers is located at such a position that said holographic optical element passes a light beam of a second wavelength launched from said other semiconductor laser, guides negative first-order diffraction light of said light beam to said objective lens, receives return light from a light spot on said recording surface, produced by said negative first-order diffraction light of said second wavelength, from said objective lens, diffracts said return light, and guides positive first-order diffraction light of said second wavelength, acquired by diffraction, to said second quarter-split light receiving surface; and said optical system further includes a light-source side aberration correcting element, located between said other semiconductor laser and said holographic optical element, for passing said light beam of said second wavelength launched from said other semiconductor laser, giving said light beam of said second wavelength such aberration as to cancel aberration, which occurs at a time said light beam of said second wavelength passes said holographic optical element, and guiding said light beam of said second wavelength to said holographic optical element, thereby eliminating aberration from said light beam of said second wavelength having passed said holographic optical element.

17. The optical pickup apparatus according to claim 16, wherein said aberration correcting element is a liquid crystal type aberration correcting element having transparent electrodes formed on inner surfaces of a pair of transparent glass substrates in a pattern corresponding to an aberration correcting wave surface, and a liquid crystal layer provided between said transparent electrodes, and can be enabled or disabled selectively by applying a voltage to said transparent electrodes in association with switching between said semiconductor lasers.

18. The optical pickup apparatus according to claim 16, wherein said aberration correcting element is an aberration correcting element of a non-linear optical material type having a transparent substrate of a wavelength-selectable non-linear optical material and an isotropic optical material, filled in recesses formed on said transparent substrate and having a pattern corresponding to an aberration correcting wave surface, and having a refractive index equal to a refractive index of extraordinary ray or a refractive index of ordinary ray of said non-linear optical material, and can be enabled or disabled selectively by applying a voltage to said transparent electrodes in association with switching between said semiconductor lasers.

\* \* \* \* \*